Aug. 23, 1966   C. K. STEDMAN   3,267,740
TEMPERATURE COMPENSATED DAMPING SYSTEM FOR
ACCELEROMETERS AND THE LIKE
Filed April 11, 1963   6 Sheets-Sheet 1

INVENTOR.
CECIL K. STEDMAN
BY Mathis & Graybeal
ATTORNEYS

Aug. 23, 1966          C. K. STEDMAN          3,267,740
TEMPERATURE COMPENSATED DAMPING SYSTEM FOR
ACCELEROMETERS AND THE LIKE
Filed April 11, 1963                       6 Sheets-Sheet 5

FLOW RESISTANCE OF CIRCULAR TUBE

EFFECTIVE MASS OF FLUID IN CIRCULAR TUBE (A)
AND BETWEEN PARALLEL PLATES (B)

INVENTOR.
CECIL K. STEDMAN
BY
Mathis & Graybeal
ATTORNEYS

INVENTOR.
CECIL K. STEDMAN

United States Patent Office 3,267,740
Patented August 23, 1966

1

3,267,740
TEMPERATURE COMPENSATED DAMPING SYSTEM FOR ACCELEROMETERS AND THE LIKE
Cecil K. Stedman, Enumclaw, Wash., assignor to Statham Instruments, Inc., Los Angeles, Calif., a corporation of California
Filed Apr. 11, 1963, Ser. No. 272,407
26 Claims. (Cl. 73—497)

This application is a continuation-in-part of my copending application Ser. No. 28,440, entitled Motion Sensing Device, filed May 11, 1960, which is now U.S. Patent No. 3,090,238, granted May 21, 1963.

The present invention relates to liquid damped motion sensing devices, and more particularly to such devices wherein means are provided to minimize the effect of change in temperature on the damping action, i.e. to render the damping ratio substantially constant over an assigned operating temperature range.

The liquid damping system characterizing the accelerometer disclosed in my prior U.S. Patent No. 3,065,639 provides substantial damping over a wide range of temperatures by use of a primarily inertial flow path in conjunction with the primarily resistive flow path through the annular passage between the suspended mass and the case of a motion sensing device. However such an arrangement suffers the disadvantage of marked variation in damping ratio with change in temperature over the range of temperatures normally encountered during use of such devices.

My aforesaid U.S. Patent No. 3,090,238 presents a damping system wherein the effect of temperature variation is reduced by adding to the damping system a flow path (there termed a "series gap") which varies in gap spacing responsive to temperature so as to reduce the variation in damping ratio resulting from temperature variation. In the specific form of damping system disclosed in said application, the suspended mass mounts an annulus forming with the case an annular passage serving as the temperature variable gap of the system. The annulus is made of a material having a relatively large coefficient of expansion, such as the polytetrafluoroethylene plastic Kel-F. This manner of temperature compensation, while affording substantial improvement over a non-compensated damping system, inherently involves certain limitations. Even though the annulus providing the variable flow gap is selected to have a relatively large coefficient of expansion, its dimensional expansion over a relatively wide operating temperature range (such as —20° F. to 160° F., for example) is only about .0025 inch, so that the gap width must be small in order to get a large enough ratio between maximum and minimum gap dimensions to provide substantial compensation. This consideration imposes a very close production tolerance with respect to the manufacture of the components providing the gap, which tolerance is on the order of .0002 inch. A further limitation of this prior temperature compensated damping system is that while its gap dimension changes essentially linearly with temperature, the viscosity of the damping liquid does not change linearly with temperature and is thus not accurately compensated. As a result, it has been the practice with respect to such prior damping systems to use only very low viscosity oil as the damping medium, because a low viscosity oil changes viscosity by a smaller factor and is therefore easier to compensate. However, use of a low viscosity oil as the damping liquid involves certain disadvantages in that a low viscosity oil has a greater volatility so is more difficult to handle during instrument fabrication. A low viscosity oil also has the disadvantage of having a relatively high volumetric coefficient of

2 expansion so is more difficult to accommodate in a sealed instrument.

Prior temperature compensated damping systems such as disclosed in my aforesaid U.S. Patent No. 3,090,238 are also relatively difficult to pretest during production in that the temperature compensated flow path thereof lies between the suspended mass and the instrument case, requiring that the instrument be completely assembled for test.

The basic objectives and purposes of the present invention are to provide a liquid damping system for use in linear accelerometers and the like, wherein the damping ratio is maintained more uniform over a wide range of operating temperatures than heretofore possible; wherein is provided a temperature compensated flow path comprised of a capsule type thermosensitive element; wherein the variable dimension gap afforded by the thermosensitive element has a sufficient change in gap dimension over an operating temperature range to substantially completely compensate for the change in damping liquid viscosity over the entire temperature range; wherein the gap dimension is of a magnitude to be easily reproduced consistent with practical manufacturing tolerances; wherein the relatively abrupt rise in flow impedance of the temperature compensated gap at higher temperatures is compensated for by fixed dimension bypass passageway means arranged in parallel flow with the temperature compensated gap; and wherein the temperature compensated flow path is arranged either entirely within the suspended mass or entirely within the case of the instrument so as to be independently testable as a subassembly during production of the instrument.

These and other objects, features and advantages and characteristics of the present invention will be apparent from the following analytical considerations and discussion of certain typical and therefore non-limitive embodiments of the invention, taken together with the accompanying drawings, wherein like letters and numerals refer to like parts, and wherein:

FIG. 1 is a view in longitudinal cross-section of a linear accelerometer employing a damping system according to the present invention, with the temperature compensating damping system components being built into the suspended mass;

Figure 7:
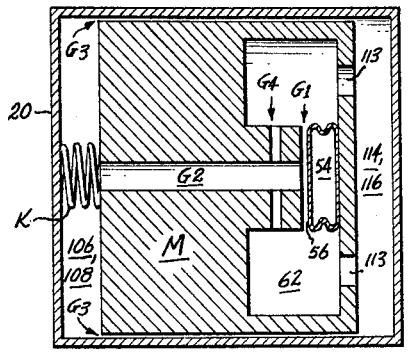
FIG. 7 is a schematic presentation illustrative of the accelerometer shown at FIGS. 1–3.
Figure 8:
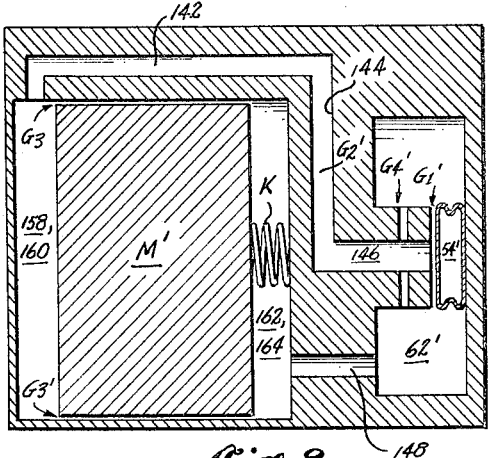
FIG. 8 is a schematic presentation illustrative of the accelerometer shown at FIGS. 4–6.
Figure 9:
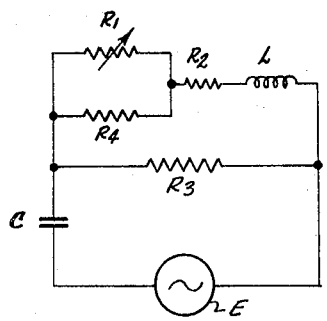
Figure 10:
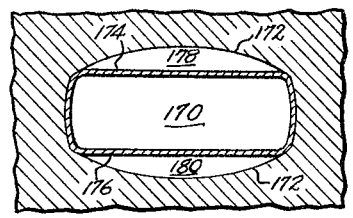
Figure 11:
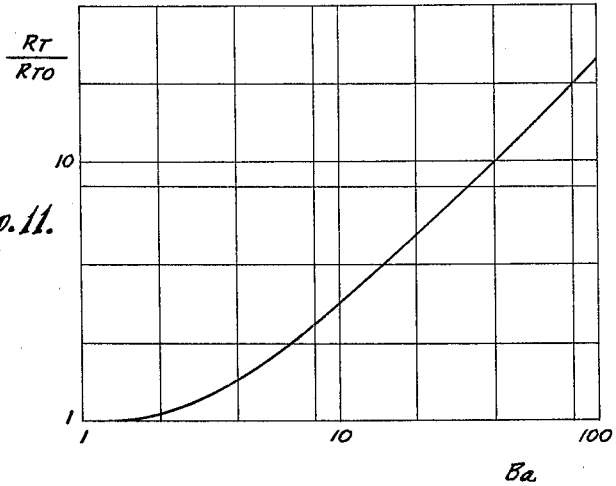
Figure 15:
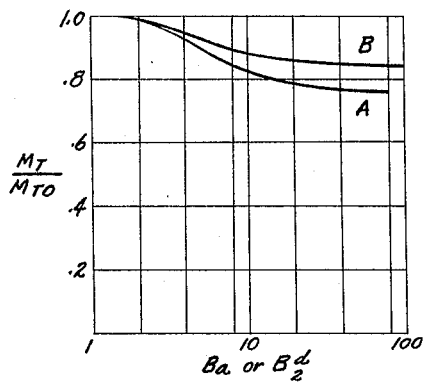
Figure 12:
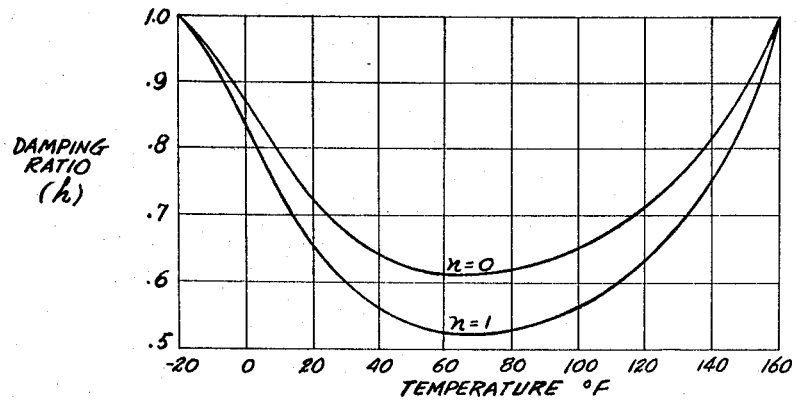
Figure 13:
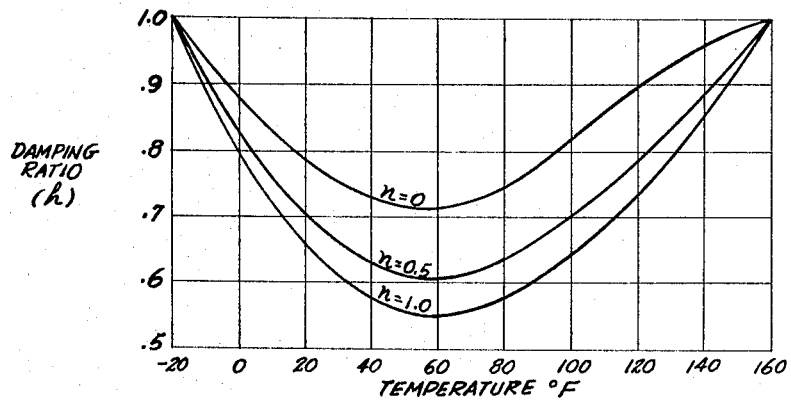
Figure 14:
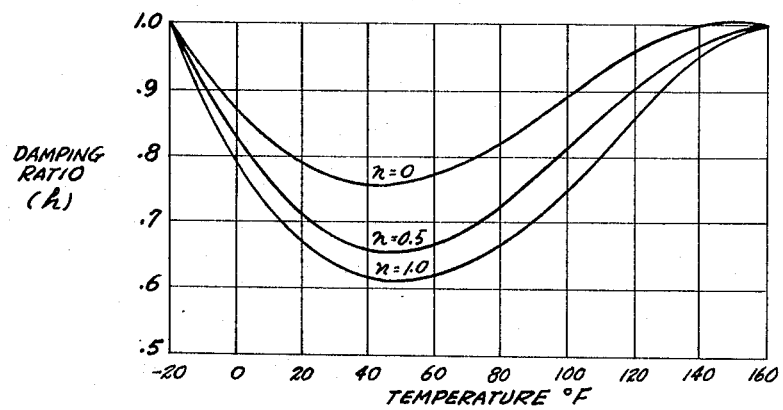

FIG. 9 portrays the equivalent electrical circuit representative of the damping systems schematically shown at FIGS. 7 and 8;

FIG. 10 is a view in lateral cross-section of a modified form of temperature controlled gap arrangement characteristic of the invention, wherein a hermetically sealed thermosensitive element is employed within a bore of circular cross-section so that temperature controlled gaps are provided between the elements and the bore to control the flow impedance presented to liquid flowing past the thermosensitive element;

FIG. 11 is a graphical presentation showing variation of the flow resistance factor $R_T/R_{T0}$ as a function of $Ba$;

FIGS. 12–14 are graphical presentations showing variation of damping ratio ($h$) as a function of temperature, to illustrate the relation of the various parameters $n$, $y$ and $z$ according to the invention; and FIG. 15 is a graphical presentation showing variation of the flow resistance factor $M_T/M_{T0}$ as a function of $Ba$ or $$B\frac{d}{2}$$

Typical constructional forms of accelerometers according to the invention will first be discussed to show the structural arrangement thereof and the significant components making up the temperature compensated damping system. Detailed treatment is then given as to certain of the considerations affecting proper design of motion sensing devices incorporating damping systems according to the invention.

Figure 2:
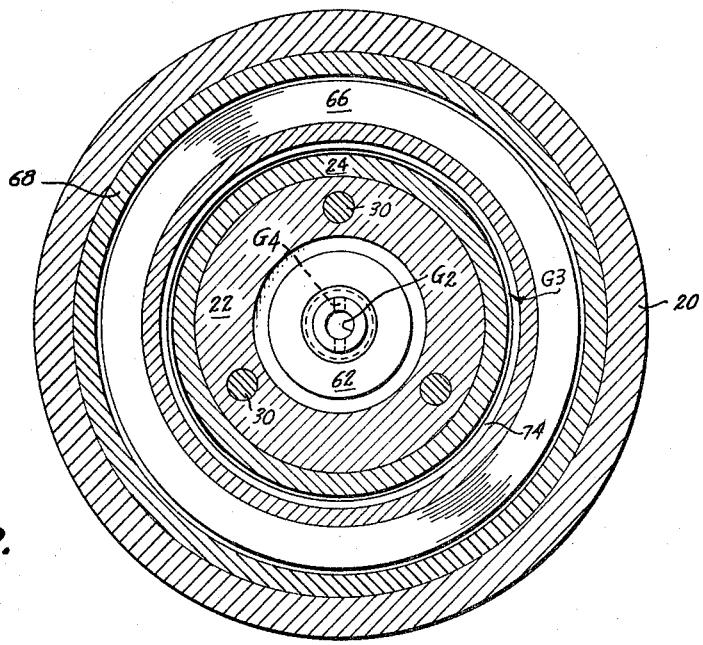
FIG. 2 is a view in lateral cross-section of the accelerometer shown at FIG. 1, taken substantially along line 2—2 thereof.
Figure 3:
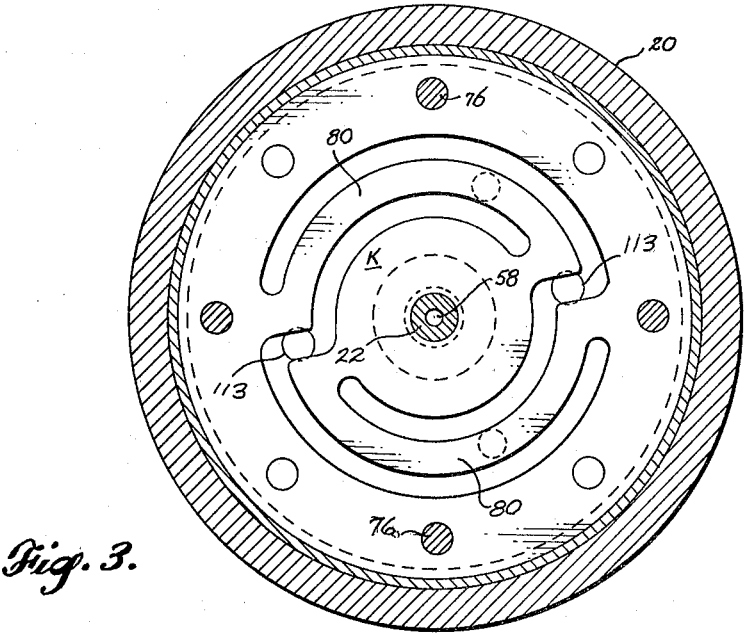
FIG. 3 is a further view in lateral cross-section of the accelerometer shown in FIG. 1, taken substantially along line 3—3 thereof.

Considering specifically the form of accelerometer illustrated at FIGS. 1–3 and schematically shown in FIG. 7, the suspended mass assembly is generally denoted at M and is mounted by means of flat springs K so as to be axially movable in the casing 20 with one degree of freedom. The suspended mass assembly M comprises an interiorly open body member 22, a spacer sleeve 24, an internal disk 26, and an end cap 28 joined to the body member 22 as by bolts 30, with pole pieces 32, 34 threaded onto the threaded end bosses 36, 38 respectively provided on the body member 22 and the end cap 28. The pole pieces 32, 34 are in juxtaposition with respect to inductor coils 40, 42, and the maximum extent of movement of the suspended mass assembly M is determined by the setting of respective adjustable stop screws 44, 46 provided centrally of the inductor coil mounting members 48, 50. The internal disk 26 in the suspended mass assembly M threadedly mounts a tube member 52, the bore of which is designated at G2. The said bore G2 constitutes the primary inertial element of the damping system (note FIG. 7); its reactance is denoted at $L_2$ and its resistive component is denoted at $R_2$ in the equivalent electrical circuit presented at FIG. 9.

Encapsulated liquid containing bellows element 54 faces the end of the bore G2 and the movable wall 56 of said bellows element 54 provides a variable, temperature controlled gap G1 (again also note FIG. 7). By way of cross-reference to the equivalent electrical circuit shown at FIG. 9, and the subsequent discussion of design considerations, the resistive component of the gap G1 is denoted $R_1$.

The body member 22 is provided with a small central bore 58 and a filler cap 60 to facilitate filling of the bellows element 54 with a suitable liquid. The liquid sealed within the bellows element 54 may be the same liquid as is used as the damping liquid, or may be any other liquid which remains in liquid phase over temperature ranges to be encountered by the mechanism and which has a coefficient of expansion consistent with other design considerations.

One or more fixed dimension bypass passageways G4 of fixed dimension further connect the passageway G2 and the plenum chamber 62 in parallel flow arrangement with the variable gap G1.

The electromagnetic components of the accelerometer shown at FIGS. 1–3 are essentially similar to those disclosed in my aforesaid copending U.S. Patent No. 3,090,238, and also in Dumas et al. U.S. Patent No. 3,076,343. These components include an input transformer 64, annular force coils 66 laterally surrounding the suspended mass assembly M, the earlier mentioned inductor coils 40, 42, and the earlier mentioned pole pieces 32, 34. In general, the inductor coils 40, 42 sense change in position of the pole pieces 32, 34 carried by the suspended mass assembly and produce an electrical output signal indicative of the relative position and movement of the suspended mass assembly M in the casing 20.

The force coils 66 are arranged in a sleeve member 68 seated in the lateral wall 70 of the casing 20, and the respective mounting members 48, 50 for the inductor coils 40, 42 are bolted coaxially to said sleeve member 68, as by bolts 76, 78. Retained also on the sleeve member 68 are peripheral seals 72, 74 and the aforementioned flat springs K, the latter being provided with respective arcuate slots 80, 82 (note FIGS. 2 and 3). Peripheral retention of said seals 72, 74 and said springs K is by annular retaining rings 84, 86 which seat on the sleeve member 68 and also in annular retaining member 88, 90, seated against the lateral wall 70.

A liquid damping medium such as 5 CS DC200 (a Dow Corning silicone oil having a viscosity corresponding to 5 centistokes) fills the accelerometer casing 20, access for filling of the casing being available through the threaded filling plug 92. To accommodate changes in volume of the damping liquid, an expansion capsule 94, filled and sealed with ambient air at atmospheric pressure, is retained at one end of the casing 20 by means of spacer disk 96 and ring seats 98, 100, the ring 100 being held in position by a split locking ring 102 seated in annular recess 104 in the lateral wall 70. Said expansion capsule 94 and its arrangement in the accelerometer are conventional per se and form no part of the present invention.

In the accelerometer shown at FIGS. 1–3, the various flow paths for the damping liquid are traceable as follows. From the chamber 106 occupied by the pole piece 34 at one end of the suspended mass assembly M, the damping liquid is in free communication through slots 82 in the adjacent flat spring K with the chamber 108 from whence it can flow either through the peripheral gap G3, leading past seals 72, 74 directly to the other end of the mass assembly M, or flow through passageway 110 into the chamber 112 adjacent disk 26, then through the inertial passageway G2 and from it through either the variable gap G1 or the bypass passageways G4 into chamber 62, from which it can flow through passageways 113 into the chamber 114 and from there through the slots 80 in the adjacent spring K into the end chamber 116 surrounding the pole piece 32. The above flow conditions describe the direction of flow when the suspended mass assembly moves to the right relative to the casing 20 in the view of FIG. 1. It will be apparent that the direction of flow is reversed throughout whenever the mass assembly moves in the opposite direction relative to the casing.

Figure 4:
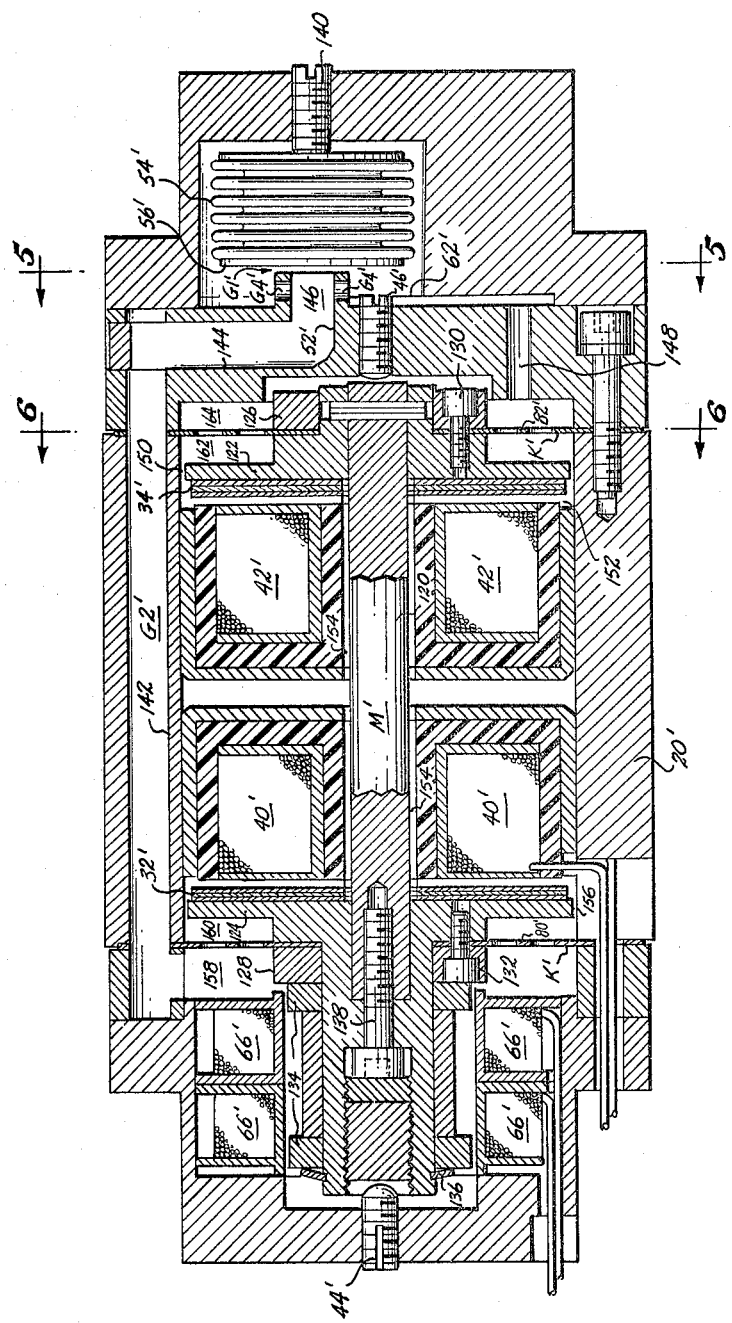
FIG. 4 is a view in longitudinal cross-section of a modified form of linear accelerometer wherein the branch flow path making up the inertial element and temperature controlled gap are arranged externally of the suspended mass and within the casing of the accelerometer.
Figure 5:
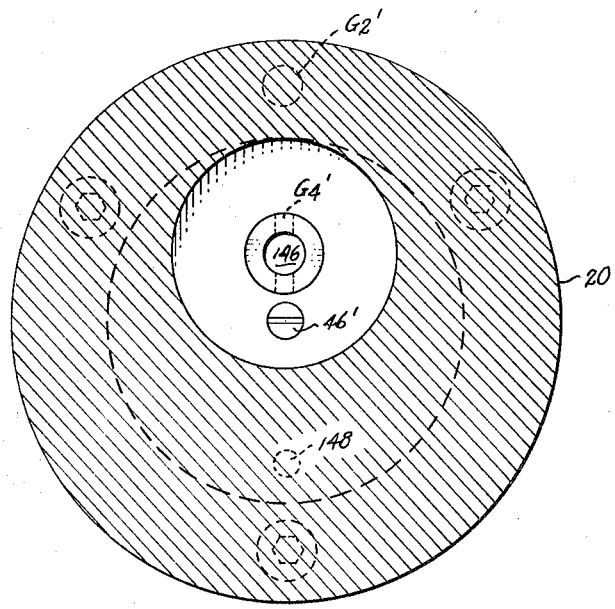
FIG. 5 is a view in lateral cross-section of the accelerometer shown in FIG. 4, taken substantially along line 5—5 thereof.
Figure 6:
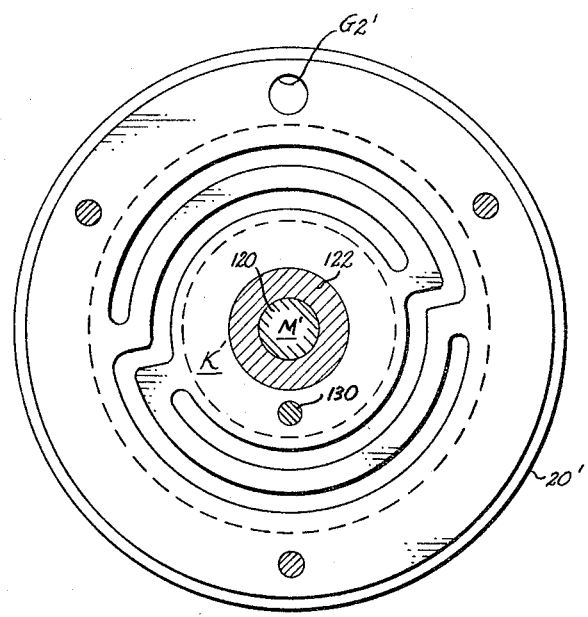
FIG. 6 is a further view in lateral cross-section of the accelerometer shown at FIG. 44, taken substantially along line 6—6 thereof.

The modified form of accelerometer shown at FIGS. 4–6 is next described, with similar components thereof being indicated by prime letters and numerals to the extent appropriate. The casing 20' is filled with a damping liquid and the mass assembly, generally designated at M', is suspended for longitudinal movement relative to the casing 20' by means of flat springs K'. The suspended mass assembly M' comprises central shaft 120, carrying at one end the pole piece mounting member 122 with its pole piece 34', and carrying at its other end a pole piece mounting member 124 with its pole piece 32'. The respective mounting members 122, 124 have bolted thereto respective retaining rings 126, 128 which, with respective bolts 130, 132, function to clamp the mass assembly M' to the flat springs K'.

The pole piece mounting member 124 is of extended configuration axially of the shaft 120 and mounts an annular pair of pole pieces 134, separated by a spacer sleeve 135 and retained in position on the mounting member by split ring 136, the mounting member 124 being retained on the shaft 120 by an end bolt 138. Said pole pieces 134 operate in conjunction with the force coils 66'. Annular inductor coils 40', 42' are fixedly mounted within the casing 20'. As will be apparent, the various coils 40′, 42′, 66′, and the various pole pieces 32′, 34′, 134 are part of the electromagnetic system of the accelerometer, and of themselves form no part of the present invention.

End stop screws 44′, 46′ are available to adjust the extent of throw of the suspended mass assembly M′ and function in like manner as the stop screws 44, 46 in the earlier discussed form of the invention.

In the accelerometer shown in FIGS. 4–6, and as also portrayed in the diagrammatic showing thereof at FIG. 8, the damping system comprises the following flow paths and components. The liquid filled and hermetically sealed bellows element 54′ is mounted at one end of the casing 20′, the mounting arrangement involving an adjustment screw 140 in threaded engagement with the end of the casing 20′. Adjustment screw 140 serves as a means to vary the static adjustment or setting of the bellows movable wall 56′ with respect to the opposing face of tube member 52′. The gap between the wall 56′ and the opposing face of the tube 52′ constitutes the variable gap G1′. Bypass passageways G4′ extend through the tube 52′ into the chamber 62′ in parallel flow arrangement with the variable gap G1′. The inertial element G2 of the earlier discussed form of accelerometer finds its counterpart in the accelerometer shown at FIG. 4 in the various passageways 142, 144, 146, 148 arranged in the casing 20′ and leading from one end of the suspended mass M′ to the other, and are generally designated G2′. The peripheral gap, comparable to the resistive gap G3 of the earlier discussed form of accelerometer, is designated G3′ in the accelerometer shown at FIG. 4 and comprises the following series of passageways; the annular gap 150 surrounding the pole piece mounting member 122, the space 152 between pole piece 34′ and the inductor coil 42′, the annular interspace 154 between the pole pieces 40′, 42′ and the shaft 120, the space between the pole piece 32′ and the inductor coil 40′, and the annular space 156 occurring around the pole piece mounting member 124. Respective arcuate slots 80′, 82′ are provided in the flat springs K′ to enable free communication of the damping liquid between respective chambers 158, 160 and chambers 162, 164.

Thus, by way of summary, the flow of damping liquid from one side of the suspended mass assembly M′ to the other can occur either through gap G3′ (through interspaces 150, 152, 154, 156), or through gap G2′ (passageways 142, 144, 146, 148), with parallel flow occurring in conjunction with the flow through G2′ either by way of the variable gap G1′ or the bypass passageways G4′.

As will be apparent, while the respective accelerometers shown at FIGS. 1 and 4 are in many respects constractionally dissimilar, the damping systems thereof are essential quite similar, the only difference being that in the accelerometer shown at FIG. 4 (and as best shown at FIG. 8), the inertial element G2′ involves series flow in the passageways 142, 144, 146 on one side of the variable gap G1′ and also series flow in the passageway 148 on the other side of the variable gap G1′, while in the FIG. 1 form of accelerometer (and as best shown in FIG. 7) the inertial element (G2) is on but one side of the variable gap G1. This differentiation is of no consequence, however, in that the flow in the inertial elements G2 and G2′ is in series insofar as the principal flow impedance (the flow impedance of the parallel path through respective gaps G3 and G3′ being much higher and therefore having no significant effect on the damping ratio). The equivalent electrical circuit for each form of accelerometer is thus identical to the other again note FIG. 9).

With reference to the equivalent electrical circuit shown at FIG. 9, the electrical components appearing across the voltage source E involve a series capacitance C representing the spring stiffness K (or K′) and two parallel paths or branches, representing the respective flow impedances encountered by the damping liquid. The resistance $R_3$ (or $R_3'$) in the first branch represents the flow resistance of the flow path periphery of the suspended mass M (or M′). The second branch represents the impedance encountered by the damping liquid in its series flow through the inertial element G2 (or G2′) and its parallel flow through the temperature controlled gap G1 (or G′) and the bypass passageways G4 (or G4′). In this second branch the inductance L represents the reactance of the inertial passageway G2 (or G2′), the resistance $R_2$ (or $R_2'$) represents the resistive component of the intertial passageway G2 (or G2′), the variable resistance $R_1$ (or $R_1'$) represents the flow impedance of the radial gap in part defined by the movable wall 56 (or 56′) of the thermosensitive capsule 54 (or 54′) and the resistance $R_4$ (or $R_4'$) in parallel with $R_1$ (or $R_1'$) represents the flow impedance of the bypass passageways G4 (or G4′).

FIG. 10 illustrates in fragmentary lateral cross-section a further form of constructional arrangement for a temperature variable gap according to the present invention. In FIG. 10, the non-circular capsule 170 is positioned within a bore 172 of oval cross-section and filled with an appropriate liquid and hermetically sealed. As shown, the capsule 170 is in part comprised of nominally flat walls or sides 174, 176. The non-circular cross-sectional configuration of the capsule 170 permits relative flexure of the capsule walls 174, 176 upon temperature induced change in volume of the liquid within the capsule 170, with the external faces of such walls becoming slightly convex upon increase in temperature and slightly concave upon decrease in temperature. As a result, the impedance to liquid flow through passages 178, 180 changes in inverse relation to the change in cross-sectional area of the passages 178, 180. Temperature induced change in viscosity of the liquid flowing through the pasageways 178, 180 is thus compensated to maintain the flow impedance more uniform with change in temperature. One advantageous characteristic of the temperature compensated flow path arrangement shown at FIG. 10 is that the capsule 170 effects temperature compensation over a quite extensive range of temperatures and without sharp cutoffs at the temperature extremes. This is because the walls 174, 176 can move toward each other a considerable distance at lower temperature extremes and are also free to move outwardly and progressively approach the contour of the bore 172 at high temperature extremes.

The following provides an analytical discussion of certain of the design considerations pertaining to damping systems according to the invention.

As has been earlier indicated, use of a deformable metal capsule such as a bellows to vary the cross-sectional dimension and accordingly the flow impedance of a flow path in a damping system, according to the present invention, affords a much larger change in dimension over an assigned temperature range than is possible by use of a solid element such as the annular plastic ring disclosed in my aforesaid U.S. Pat. No. 3,090,238.

However, even though a capsule type thermosensitive element affords adequate change in gap width, such a temperature compensated gap does not of itself provide optimum temperature compensation over a wide temperature range. To illustrate, the flow resistance of a flow path with a gap of width $d$, through which flows an oil of viscosity $\mu$, is proportional to $\mu d^{-3}$. If, starting at the selected lower temperature limit, the gap width $d$ grows smaller proportionally with change in temperature, then the increase in $d^{-3}$ per degree is relatively small at low temperatures and progressively increases as the temperature increases and $d$ decreases. The change in viscosity $\mu$ of the damping liquid has the opposite behavior in that it varies most rapidly at low temperature and more slowly as the temperature rises.

By suitable choice of parameters, the relationship $\mu d^{-3}$ can be made to have the same values at any two temperatures $t_1$ and $t_2$, but necessarily has smaller values at intermediate temperatures.

If, for example, the encapsulated oil is 5 CS DC200 and the assigned temperature limits are $-20°$ F. and $160°$ F., the minimum value of $\mu d^{-3}$ is about 60% of its value at the temperature extremes. The above assumes that there is linear variation of $d$ with change in temperature, i.e. that the oil in the thermosensitive capsule has a volume coefficient of expansion independent of temperature. This assumption is essentially correct for the oil 5 CS D200 and for oils of higher viscosity.

Lighter viscosity liquids, such as the oil .65 CS DC200 (having a viscosity corresponding to .65 centistokes) show wider variation in volume coefficient of expansion. The oil .65 CS DC200 exhibits a coefficient about 40% less at $-20°$ F. than at $160°$ F., for example. Such a lighter oil is therefore not normally suitable for use as the liquid in the thermosensitive capsule, in view of the poorer compensation afforded.

Performance cannot be improved by incorporating a variable spring rate in the thermosensitive capsule, because the liquid hermetically sealed in the capsule is essentially incompressible and assumes a particular volume at a given temperature regardless of the restraining pressure.

At the upper temperature limit, the gap dimension $d$ becomes small and the increase of $d^{-3}$ per degree is relatively quite large, resulting in an abrupt rise in flow resistance. An important practical feature of the present invention is the compensation of "leveling out" of this abrupt increase in flow resistance at the upper temperature limit, which compensation is effected by use of bypass passageway means of fixed dimension and in parallel flow relation with the temperature compensated flow path. The resistance of such bypass passageway means is such that its effect is minor at low temperatures when the variable gap is large, with its effect becoming increasingly pronounced as the upper temperature limit is approached.

Design considerations for damping systems in accordance with the invention are presented by the following analysis and quantitative treatment. For purposes of an illustrative treatment of the design considerations, a temperature compensation arrangement has been selected which involves a variable radial gap shunted by bypass passageways of fixed dimension (as is characteristic of the accelerometers illustrated at FIGS. 1–9).

In the following analysis, $a$ represents the radius of the inertial gap G2, $b$ represents the radius of the radial gap G1, and $d$ represents the G1 gap dimension between the end of the tube 52 and the movable wall 56 of the bellows element 54.

The resistance to radial flow in the radial gap G1 is:

$$R_1 = \frac{12\mu}{2\pi d^3} \log_e \frac{b}{a} \quad (1)$$

$$= \frac{12\mu}{\pi d^3} \left[ \frac{b/a-1}{b/a+1} + \frac{1}{3}\left(\frac{b/a-1}{b/a+1}\right)^3 + \cdots \right] \quad (2)$$

If $$\frac{b}{a} \leq 2$$

the error that results from using only the first term of the expansion is less than 4%. Then it can be written in the form $$R_1 = \frac{12\mu}{d^3} \frac{b-a}{2\pi\left(\frac{b+a}{2}\right)} \quad (3)$$

This is the usual formula for the flow resistance between parallel plates, the effective length being the radial length of the gap, and the transverse width, the mean circumference. Separating out the temperature-dependent factors we can define the resistance $R_1$ of the gap G1 as a function of temperature $t$ in the following manner:

$$R_1(t) = R_1(t_1) \frac{\mu(t)}{\mu(t_1)} \left(\frac{d(t_1)}{d(t)}\right)^3 \quad (4)$$

where $t$ is a variable temperature and $t_1$ the low temperature limit. Similarly, if $R_4$ represents the resistance of the bypass passageway means G4, its definition as a function of temperature $t$ is as follows:

$$R_4(t) = R_4(t_1) \frac{\mu(t)}{\mu(t_1)} \quad (5)$$

If we designate the combined resistance with a subscript "D" (for damping), then $$R_D(t) = \frac{R_1(t) R_4(t)}{R_1(t) + R_4(t)} \quad (6)$$

With respect to the variation in viscosity of the damping liquid over the assigned temperature range, taking the damping oil 5 CS DC200 as a typical example, the viscosity thereof is approximately halved when the temperature rises from $-20°$ F. to $20°$ F. The cuboid of 2 is 1.26, so in order to match the change in the flow resistance $R_1$ with the change in viscosity over this range, the gap dimension $d$ would have to decrease about 21% in the temperature interval. If the change in gap dimension $d$ were linearly proportional to the temperature change, the temperature compensated gap would be completely closed at about $170°$ F. For the instrument to be useful at a maximum assigned operating temperature of $160°$ F., such condition is obviously impractical, so a smaller maximum variation of $d$ is to be tolerated in the lower temperature interval. As a practical upper limit for temperature compensated gap closure, the following relationship can be assigned:

$$d(t_2) = 0.2 d(t_1) \quad (7)$$

where $t_1$ and $t_2$ are the operating temperature limits. If $t_1 = -20°$ F. and $t_2 = 160°$ F., the gap closes completely at about $205°$ F.

In general the change in gap dimension ($\Delta d$) over the assigned temperature range can be denoted by the parameter $z$. Thus, in general, where Equation 7 corresponds to the case where $z=0.8$, the generalized relation with respect to the parameter $z$ can be expressed as follows:

$$d(t) = d(t_1)\left(1 - z\frac{t-t_1}{t_2-t_1}\right) \quad (8)$$

The remaining contribution to the total damping is that of the inertial gap G2. Its resistance $R_2$ as a function of temperature can be written:

$$R_2(t) = R_2(t_1) \frac{\mu(t)}{\mu(t_1)} \frac{\frac{R_T}{R_{T0}}(t)}{\frac{R_T}{R_{T0}}(t_1)} \quad (9)$$

where the ratio $R_T/R_{T0}$ is the ratio of the high frequency flow resistance in a tube of circular cross-section as compared with the low frequency value thereof.

FIG. 11 is a log log graphical presentation of values of this complex ratio, plotted as a function of the parameter $Ba$. The significance of the parameter $Ba$ is developed more specifically in my aforesaid U.S. Pat. No. 3,090,238 and the said application in its treatment in this respect is corporated herein by reference. In general, the parameter $Ba$ describes the character of flow in a passageway, regardless of tube size, according to the following factors:

$$Ba = a\sqrt{\frac{w}{2v}} \quad (10)$$

where $w$ is $2\pi f$ and $v$ is the kinematic viscosity of the liquid. Considerations with respect to this parameter $Ba$ are also more fully developed in my paper entitled "Alternating Flow of Fluid in Tubes," published in January 1956, as Statham Instrument Note No. 30, by Statham Instruments, Inc., Los Angeles, California.

The inertial gap G2 is designed so that the parameter $Ba$ thereof is greater than 2, whereas the bypass passageway means G4 is designed so that its parameter $Ba$ is much less than 2.

Consistent with these relationships, the total damping resistance as a function of temperature is:

$$R(t) = R_2(t) + \frac{R_1(t) R_4(t)}{R_1(t) + R_4(t)} \quad (11)$$

The values of $R_2$ and $R_4$ at the low temperature limit $t_1$, in relation to the value of $R_1$ at the lower temperature limit yield the further design parameters $n$ and $y$, discussed more fully below, which parameters $n$ and $y$ are expressed in equation form as follows:

$$n = \frac{R_2(t_1)}{R_1(t_1)} \quad (12)$$

$$y = \frac{R_4(t_1)}{R_1(t_1)} \quad (13)$$

Substitution of Equations 4, 5 and 9 in Equation 11 using the parameters $n$, $y$ and $z$ from Equations 12, 13 and 8 gives $$\frac{R(t)}{R_1(t_1)} = \frac{\mu(t)}{\mu(t_1)} \left[ \frac{\left(1 - z\frac{t-t_1}{t_2-t_1}\right)^{-3}}{\frac{1}{y}\left(1 - z\frac{t-t_1}{t_2-t_1}\right)^{-3} + 1} + n\frac{\frac{R_T}{R_{T0}}(t)}{\frac{R_T}{R_{T0}}(t_1)} \right] \quad (14)$$

The damping ratio of an instrument depends on the actual value of $R(t)$ in relation to the stiffness K and mass M, but to study the compensation of the damping it is only necessary to consider relative values of $R(t)$ as given by the dimensionless expression on the right side of Equation 14. For purposes of this analysis, only the damping oil 5 CS DC200 need be considered, because liquids of heavier viscosity do not exhibit significantly greater variation of damping ratio with change of temperature. Accordingly, only the three parameters $n$, $y$ and $z$ need be specifically investigated.

The resistive component $R_2$ of the inertial gap G2 must not be large as compared with the resistance $R_1$ of the temperature compensated gap G1, so for $n$ the significant range is 0 to 1.0. The value 0 cannot be realized in practice, but provides a reference against which other values thereof can be readily compared. FIG. 12 shows the performance obtained with no bypass passageway means, i.e. with $y = $ to $\infty$. In FIG. 12, the curves have been arbitrarily normalized to a value of 1.0 at the temperature limits of $-20°$ F. and $160°$ F., the $z$ values shown were fixed by applying the criterion that the damping should have the same value at the upper and lower temperature limits. With no damping in the inertial element ($n=0$) the minimum damping ratio is 0.605, and is barely within an assigned damping ratio specification requiring the minimum damping ratio to be at least 60% of the maximum damping ratio. With appreciable damping ($n=1$) in the inertial element, the minimum damping ratio is 0.516, as shown by the lower curve in FIG. 12, and such specification would not be met.

When bypass passageway means G4 is added with no change of parameters $n$ or $z$ from the values shown in FIG. 12, the damping at $160°$ F. drops below its value at $-20°$ F. To restore the equality of damping at the two temperature extremes, $z$ can be increased. For the purpose of exploring the effects of $y$ and $z$, it is immaterial whether fixed values of $z$ are assigned and $y$ is computed to equalize the damping at the temperature extremes, or vice versa.

Following the former procedure, typical relationships where $z=0.7$ are shown in FIG. 13, and typical relationships where $z=0.8$ are shown in FIG. 14. In FIG. 13, with no damping ($n=0$), and with $y$ equalling 10.3, the minimum damping ratio is .704. With substantial damping ($n=0.5$), and with $y$ equalling 17.5, a minimum damping ratio is .61. With further increased damping in the inertial gap ($n=1.0$) and with $y$ equalling under 7.3, the minimum damping ratio is .555. Similarly, in FIG. 14, showing the relationships of the parameters with the parameter $z$ equalling 0.8, with no damping ($n=0$) and with $y$ equalling 8.4, the minimum damping ratio is .76. With the addition of a substantial damping G2 ($n=0.5$), and with $y$ equalling 13.0, the minimum damping ratio is .67. With still greater damping ($n=1.0$) and with $y$ increased to 17.8, the minimum damping ratio is .603.

For any given value of the parameter $n$, it is seen from FIGS. 12–14 that a steady improvement is obtained in the uniformity of the damping ratio as the gap closure ratio (parameter $z$) is increased. For design purposes, it is thus considered preferable to use a relatively large value of the parameter $z$, e.g. a value of $z=0.8$, coupled with bypass passageway means providing a resistance $R_4$ which is of significantly greater resistance than the resistance $R_1$ of the temperature compensated gap, i.e. where the parameter $y$ is finite but considerably greater than one, e.g. on the order of ten.

From FIGS. 12–14 it is also notable that the deterioration of the compensation with increasing damping in the inertial element G2 is more marked when $z$ is large. Where $z=0.8$ and with $n=1.0$, the assigned specification with respect to damping ratio is barely met, while with $n=0.5$ the damping ratio specification is met with a substantial margin. For this reason, it is considered preferable to make $n$ equal about 0.5 as a practical design figure, but it is to be kept in mind that the larger the value of $n$, the smaller the length $L_2$ and the gap radius $a_2$ become, so $n$ should be as large as can be tolerated in any given design circumstance.

From a practical point of view, a damping system wherein the damping ratio varies throughout a wide temperature range by a factor of only about 0.6:1.0 or less is a major improvement over prior damping systems and is considered to provide a "substantially constant" damping ratio. The term is accordingly used herein in this context.

Consideration is next given to specific design procedures according to the present invention, with particular reference to the equivalent schematic illustrated at FIG. 7, by way of example.

According to customary practice, assigned design specifications dictate the natural frequency of the instrument at a given temperature, the upper and lower limits of the damping ratio $h$, the radius R of the mass M, and the required temperature range. By way of example, the specification as to the damping ratio limits is here taken as $0.6 \leq h \leq 1.0$, and the operating range is here taken as $-20°$ F. to $160°$ F.

The stiffness K of the springs is fixed at the lowest value compatible with the (excitation dependent) negative stiffness of the associated electromechanical system.

With the chosen parameters $n$, $y$ and $z$, $R_2$ contributes 35% of the total damping at the lower temperature limit and $R_1$ shunted by the bypass $R_4$ (i.e. the damping resistance $R_D$) contributes 65%.

The quantities to be determined are: $d(t_1)$; $a$; $b$; $L_4$; $a_4$; the length $L_2$ and radius $a_2$ of the inertial gap G2; the length $L_3$ and gap dimension $d_3$ in the peripheral gap G3; G4; the bellows effective area; and the oil viscosity $\mu$.

To center the damping ratio variation within the range 0.6 to 1.0, it is assumed that the damping ratio value at the lower temperature equals 0.95, i.e. $h(t_1) = 0.95$. Then the damping ratio that would be observed by $R_2$ acting alone is $h_{R_2}(t_1) = .35 \times .95 = 0.33$. It then follows that $B_0(t_1) a_2 = 2.3$ where $$B_0(t_1) = \frac{w_0}{2v(t_1)}$$

$w_0$ being the natural frequency in radians, and $v(t_1)$ being the kinematic viscosity of the damping oil at $-20°$ F. Then, $$\frac{10.6}{w_0} = \frac{a_2^2}{v(t_1)} \quad (15)$$

The effective mass is:

$$M = A_e^2 L_2 \frac{4}{3} \frac{\rho}{\pi a_2^2} \frac{M_T}{M_{T0}} \quad (16)$$

where $M_T/M_{T0}$ represents the ratio of effective mass of the fluid ($M_T$) in relation to the mass of the fluid at low temperature $M_{T0}$. With respect to this ratio $M_T/M_{T0}$, FIG. 15 present a semi-log graph of $M_T/M_{T0}$ values as a function of the parameter $Ba$ (in the case of a circular tube) or $$B\frac{d}{2}$$

(in the case of a flow path as between parallel plates). More specific treatment of the ratio $M_T/M_{T0}$ is given in the aforesaid Statham Instrument Note No. 30, to which reference should be made for a fuller consideration of this relationship. Curve A in FIG. 15 shows the manner of change of the effective mass ratio in the case of a circular tube, and curve B in FIG. 13 shows the manner of change thereof in the case where the gap comprises flat parallel surfaces.

In view of the relationship presented by Equation 16, $$w_0^2 = \frac{K}{M} = \frac{3}{4} \frac{K}{A_e^2 L_2} \frac{\pi a_2^2}{\rho} \frac{M_{T0}}{M_T} \quad (17)$$

When $B_0(t_1)a_2 = 2.3$ and $M_T/M_{T0} = .98$, Equation 17 becomes $$.42 = \frac{w_0^2 A_e}{K} = \frac{a_2^2}{L_2 \rho_{(T0)}} \quad (18)$$

The quantities on the left side of Equations 15 and 18 are known, so for a damping liquid having a viscosity corresponding to 5 centistokes or higher, the dimensions $a_2$ and $L_2$ can be computed. For a lower viscosity oil the damping parameters $n$, $y$ and $z$ can be appropriately re-evaluated.

$L_2$ in Equation 18 is the effective length. The corresponding physical length is $L_2 - 1.7a_2$ when only one end empties into an open chamber. Corrections as to mass and resistance at the leading end of the annular gap G1 are not of significance and can be disregarded.

Consideration is next given to the element $R_1$.

$$h_{RD}(t_1) = .65 \times .94 = .62$$

so an unshunted $R_1$ would contribute a damping ratio as follows:

$$h_{R_1}(t_1) = \frac{14}{13}(.62) = .67$$

Then the equation $$h_{R_1}(t_1) = .67 = \frac{A_e^2 R_1(t_1) \omega_0}{2K} \quad (19)$$

gives $R_1(t_1)$. Substituting in Equation 1 we get:

$$.70 \frac{K}{A_e^2 w_0 \mu(t_1)} = \frac{1}{d^3(t_1)} \log_e \frac{b}{a} \quad (20)$$

Equation 3 can also be used if more convenient. There is some latitude in the choice of $d(t_1)$ providing the parameter $z = 0.8$ is satisfied and provided the gap G1 is sufficiently resistive. The ratio of its resistance to reactance is $5/B^2d^2$. By comparison, the damping ratio of an instrument in which such a passage provided all the inertance and resistance would be $5/2B^2d^2$. A quantitative criterion for permissible reactance can be readily determined empirically from the equivalent electrical circuit (FIG. 9) and its effects upon response thus directly determined. A practical upper limit with respect to the reactance of the gap G1 is considered to be that the value of the reactance of G1 should not exceed about 10% of the resistance $R_1$ thereof. Of the various factors involved, it will be noted that $1/B^2d^2$ is proportional to $v/d^2$, while $v$ changes by a factor of 8 and $d^2$ by a factor of 25. So the worst condition exists at the lowest temperature ($t_1$) where the following condition must be met:

$$\frac{w_0 d^2(t_1)}{v(t_1)} \leq 1 \quad (21)$$

With this condition met, the compromise is between small travel, which imposes closer tolerances, as against larger travel, which reduces the mechanical rigidity and may require a larger radius $b$. A suitable value with this respect is readily determinable by trial and error, utilizing different oil volumes and bellows areas. The ratio $b/a$ can then be calculated. The inner radius $a$ is preferably but not necessarily the same as the radius $a_2$ of the inertial gap G2. However, if the resulting value of $b$ is inconvenient, a short tapered section can join $a_2$ to $a$.

To determine $L_4$, $a_4$ we know that $R_4(t_1) = 13R_1(t_1)$. So, using Equation 19, $$R_4(t_1) = L_4 \frac{8\mu(t_1)}{\pi a_4^4} = 17.4 \frac{K}{A_e^2 \omega_0} \quad (22)$$

or $$6.83 \frac{K}{A_e^2 \omega_0 \mu(t_1)} = \frac{L_4}{a_4^4} \quad (23)$$

Like $R_1$, $R_4$ must be predominantly resistive. The ratio of resistance to reactance for a tube is $3/B^2a^2$. In this case the worst condition exists at high temperature so, using the same criterion of 10% reactance, we get $$\frac{\omega_0 a_4^2}{v(t_2)} \leq 0.6 \quad (24)$$

Using this relationship a tentative value of $a_4$ can be calculated which can be substituted in Equation 23 to get $L_4$. If $L_4$ turns out to be too long, $a_4$ can be reduced as much as desired and $L_4$ correspondingly shortened. If $L_4$ turns out to be inconveniently short it is possible to provide an appropriate number N of the holes in parallel, each of length $NL_4$. The bypass passageway means G4 is thus shown in FIGS. 1–3 and 7 as comprised of two holes, simply by way of example.

The last element to be considered is $R_3$. The flow resistance of the peripheral gap G3 should be high compared with the impedance of the passage through the piston so that its effect upon the response of the instrument is negligible. The impedance through the mass M varies with frequency and with temperature, but never differs substantially from $1.5R_1(t_1)$. Again, the equivalent circuit can be used to establish a precise criterion, and a general condition in this respect is $$R_3 \geq 15R_1(t_1) \quad (25)$$

This condition should be satisfied at the highest temperature ($t_2$). Substituting the value of $R_1$ from Equation 19 we get $$R_3(t_2) = L_3 \frac{12\mu(t_2)}{d_3^3} \frac{1}{2\pi R} \geq \frac{20K}{A_e^2 \omega_0} \quad (26)$$

or $$\frac{KR}{A_e^2 \omega_0 \mu(t_2)} \leq \frac{L_3}{d_3^3} \quad (27)$$

This relationship can be easily satisfied so there is considerable latitude in selection of $L_3$ and $d_3$.

Flow in the inertial element will become turbulent, with resultant dynamic nonlinearity, if the flow velocity becomes sufficiently high. By definition the Reynolds number is $$R_e = \frac{\text{average velocity} \times \text{diameter}}{\text{kinematic velocity}} \quad (28)$$

If the peak mass travel is $x_{\max}$, the average fluid velocity is $$\frac{x_{\max} \omega_0 A_e}{\pi a_2^2} \quad (29)$$

and $$R_e = \frac{2}{\pi} \frac{X_{max}\omega_0 A_e}{a_2 v} \quad (30)$$

The highest value of $R_e$ occurs at the highest temperature. In the present design procedure $v$ is chosen arbitrarily and $a_2$ is dictated by $v$ through Equation 15. So the $a_2v$ in the expression for $R_e$ is proportional to $v^{3/2}$. The desire to keep $a_2$ small thus imposes an upper limit on damping liquid viscosity, and the need to keep $R_e$ small imposes a lower limit.

The limiting condition for dynamic linearity in an instrument of a particular design can best be determined by direct measurement. As a routine precaution the corners of the inertial element G2 should be rounded and polished. Flaring of G2 at the ends will oftentimes aid in reducing turbulence.

The following presents a typical calculation. Specified or predetermined values are:

$f_0 = 9$ cps.
$w_0 = 56.5$/sec.
$.6 \leq h \leq 1.0$ from $-20°$ F. to $160°$ F.
$R = 1.35$ cm., $A_e = 5.72$ cm.$^2$
$K = 3 \times 10^6$ dynes/cm.
Oil is 5 CS DC200

The viscosity and density of 5 CS DC200 over the assigned temperature range are as follows:

| ° F. | $v$ | $\rho$ | $\mu$ | $\frac{\mu(t)}{\mu(t_1)}$ |
|---|---|---|---|---|
| −20 | 20.0 | .980 | 19.6 | 1.00 |
| 0 | 14.0 | .963 | 13.5 | .689 |
| 20 | 10.0 | .950 | 9.50 | .485 |
| 40 | 7.4 | .940 | 6.96 | .355 |
| 60 | 5.85 | .928 | 5.43 | .277 |
| 100 | 3.92 | .905 | 3.55 | .181 |
| 120 | 3.32 | .893 | 2.96 | .151 |
| 140 | 2.88 | .880 | 2.53 | .129 |
| 160 | 2.51 | .870 | 2.18 | .111 |

Equations 15 and 18 give $a_2 = .194$ cm.
$L_2 = 2.78$ cm.
$L_2 - 1.7a_2 = 2.45$ cm.

From Equation 19

$$\log_e \frac{b}{a} = 19.0 \times 10^4 d^3(t_1) \quad (31)$$

If $t_1 = -20°$ F., then $d(t_1) = .038$ cm. (15 mils), the left side of Equation 21 becomes 0.41, and if $t_2 = 160°$ F., then $d(t_2) = 3$ mils. These are satisfactory values so, substituting in Equation 31, we get $b/a = 1.37$. If $a = a_2$, $b = .266$ cm. The radial gap G4 length is only about twice as great as $d(-20)$, so end corrections would in this case upset the compensation ratio. It is therefore better to flare out the end of G2 and make $a$ somewhat larger. For example let $a = 0.4$ cm., $b = .548$ cm. Then the radial gap length is about 60 mils.

After inserting numerical values, Equation 23 becomes $$5.66 \times 10^4 = L_4/a_4^4 \quad (32)$$

With the equality in Equation 24 we get $a_4 = .0163$ cm., and substitution of this value in Equation 32 gives $L_4 = .0040$ cm. This is too small in relation to the diameter. To increase the length, use an array of N holes, each one of length $.004N$ cm.

After inserting numerical values, the equality in Equation 27 becomes $$1.0 \times 10^5 = L_3/d_3^3 \quad (33)$$

If $L_3 = 1$ cm., $d_3 = .0216$ cm. So any gap less than 8 mils satisfies Equation 25. If this criterion errs on the low side, $d_3$ can be 5 mils or other appropriate dimension without imposing any difficulty in manufacture.

From the foregoing, various further modifications, variations, and adaptations of the basic design considerations, constructional arrangements and operational characteristics pertaining to the invention will be apparent to those skilled in the art to which the invention is addressed, within the scope of the following claims.

What is claimed is:

1. In a liquid damped motion sensing device comprising a case, a suspended mass mounted for relative movement within said case, a damping liquid in said case in which said suspended mass is immersed, and passageway means for said liquid permitting flow thereof from one end of said mass to the other upon relative movement of said mass within the case, the improvement wherein said passageway means comprises a primarily inertial flow path and a primarily resistive flow path in series with said primarily inertial flow path, said primarily resistive flow path comprising a temperature variable gap in part including a movable portion of a liquid filled, hermetically sealed element, the cross-sectional area of said gap being varied in response to change in volume of the liquid filling said hermetically sealed element.

2. A liquid damped motion sensing device according to claim 1, wherein said movable portion of said hermetically sealed element is of non-circular cross-section.

3. A liquid damped motion sensing device according to claim 1, wherein said hermetically sealed element is in the form of a bellows.

4. A liquid damped motion sensing device according to claim 1, wherein said temperature variable gap comprises a fixed wall bore and a hermetically sealed element of non-circular cross-section with certain wall portions of said element in contact with said bore and with certain other wall portions of said element being spaced from and movable with respect to said bore.

5. A liquid damped motion sensing device according to claim 4, wherein the said other wall portions of said hermetically sealed element comprise nominally flat wall means arranged to change in cross-sectional configuration and thereby change the cross-sectional area of said temperature variable gap with change in temperature.

6. In a liquid damped sensing device comprising a case and a suspended mass mounted in said case by means of a movable constraint; a damping system comprising a liquid flow passageway from one end of said suspended mass to the other, said passageway being comprised of a primarily inertial portion of fixed cross-sectional dimension and a primarily resistive portion in series flow relation with said primarily inertial portion, said primarily resistive portion being in part defined by a movable portion of a hermetically sealed, liquid filled thermosensitive element of non-circular cross-section, the said portion of said thermosensitive element varying the cross-sectional dimension of said passageway with change in temperature, with the cross-sectional area of such temperature controlled variable flow path being correlated with the volumetric coefficient of expansion of the liquid within said thermosensitive element and with the viscosity of said damping liquid so that said damping system has a substantially constant damping ratio over a wide range of temperature, the said liquid flow passageway being arranged in said suspended mass to render such an independently testable subassembly.

7. A liquid damped motion sensing device comprising a case, a suspended mass mounted in said case by means of a yieldable constraint allowing relative motion of said mass in said case, a damping liquid in said case, said suspended mass being immersed in said liquid, a plurality of passageways for said liquid permitting flow thereof from one end of said mass to the other upon relative movement of said mass within the case, the passageways for liquid flow comprising a first flow path of fixed dimension cross-sectionally, and a second flow path in parallel arrangement with the first-mentioned flow path, said second flow path being comprised of a primarily inertial element of fixed cross-sectional dimension and a primarily resistive element in series flow relation with said primarily inertial element, said primarily resistive element being in part formed by a wall moved in response to change in volume of a liquid filled, hermetically sealed element, the extent of movement of said wall being such as to substantially uniformly compensate for variation in viscosity of the damping liquid with change in temperature.

8. A liquid damped motion sensing device according to claim 7, wherein the liquid in said hermetically sealed element is of essentially the same constituency as the liquid in which the suspended mass is immersed.

9. A liquid damped motion sensing device according to claim 8, wherein said hermetically sealed element is in the form of a bellows having a movable face serving as the said wall.

10. A liquid damped motion sensing device according to claim 9, wherein said hermetically sealed element comprises a flat movable face arranged with respect to the flow of the damping liquid so that the damping liquid flow is substantially parallel to said face.

11. A liquid damped motion sensing device according to claim 7, wherein the said second flow path comprises an annular gap wherein the liquid flows radially of the gap, with the said wall moved by the said hermetically sealed element being one wall of said annular gap.

12. A liquid damped motion sensing device according to claim 11, wherein fixed dimension passageway means are arranged in parallel with said annular gap and in series with said primarily inertial element, so that an effective upper limit is imposed on the flow resistance through said primarily inertial element.

13. A liquid damped motion sensing device according to claim 7, wherein said hermetically sealed element is a part of said suspended mass.

14. A liquid damped motion sensing device according to claim 7, wherein said hermetically sealed element is a part of said case.

15. A liquid damped motion sensing device according to claim 7, wherein the said wall provides a gap of variable cross-section, and said device further comprises means for adjustably varying the cross-sectional area of said gap independently of the variation thereof by said hermetically sealed element.

16. A liquid damped motion sensing device according to claim 7, wherein said second flow path comprises by-pass passageway means of fixed dimension cross-sectionally, said bypass passageway means being arranged in parallel flow relation with the flow path past the wall moved by said hermetically sealed element.

17. A liquid damped motion sensing device according to claim 16, wherein said bypass passageway means is characterized by a primarily resistive flow impedance.

18. A liquid damped motion sensing device comprising a case, a mass mounted in said case by means of a yieldable constraint allowing relative motion of said mass in said case, a damping liquid in said case, said suspended mass being immersed in said liquid, a plurality of flow paths for said liquid permitting flow thereof from one end of said mass to the other upon relative movement of said mass within the case, the passageways for liquid flow comprising a relatively high impedance flow path between the suspended mass and the case, and a further flow path in parallel relation to said high impedance flow path and comprising a primarily inertial element in series flow relation with a primarily resistive temperature controlled gap and a primarily resistive bypass passageway means in parallel with said temperature controlled gap, the temperature controlled gap varying in cross-sectional area in relation to change in volume of a liquid within a hermetically sealed capsule.

19. A motion sensing device according to claim 18, wherein the flow impedance through the temperature controlled gap is primarily resistive and is greater than the resistive component of the flow impedance through said primarily inertial element.

20. A motion sending device according to claim 18, wherein the resistive component of the flow impedance of said primarily inertial element is about half the resistive component of the flow impedance through said temperature controlled gap.

21. A motion sensing device according to claim 18, wherein the cross-sectional area of said temperature controlled gap at minimum design operating temperature is about five times the cross-sectional area thereof at maximum design operating temperature.

22. A motion sensing device according to claim 18, wherein the resistive component of the flow impedance through the said bypass passageway means is on the order of about ten times the resistive component of the flow impedance of the temperature controlled gap at minimum design temperature.

23. A motion sensing device according to claim 18, wherein the minimum damping ratio of the liquid damping system is at least about 0.6 of the maximum damping ratio thereof over a wide range of operating temperatures.

24. A motion sensing device according to claim 23, wherein said range of operating temperatures is from about −20° F. to about 160° F.

25. A liquid damped motion sensing device comprising a case, a mass suspended in said case for relative movement in one direction of freedom, a damping liquid surrounding said mass, and liquid flow passageways for said liquid, said liquid flow passageways comprising a relatively high impedance gap between said mass and said case, a further flow path for said damping liquid in parallel relation to said high impedance gap and comprising a primarily inertial element having a resistive component $R_2$, said primarily inertial element being in series flow relation with a primarily resistive temperature controlled gap having a gap dimension $d$ and a resistive component $R_1$, the said primarily resistive temperature controlled gap being in parallel flow relation with a primarily resistive bypass passageway means having a resistive component $R_4$, the arrangement of the said primarily inertial element, the said temperature controlled gap, and the said bypass passageway means being such that the ratio $R_2/R_1$ at minimum operating temperature of the device is less than 1, the ratio $R_4/R_1$ at minimum operating temperature is on the order of 10, and the change in gap dimension $d$ from minimum operating temperature to maximum operating temperature is at least about 0.6 of the gap dimension at minimum operating temperature.

26. A liquid damped motion sensing device according to claim 25, wherein the ratio $R_2/R_1$ at minimum operating temperature is about 0.5, the ratio $R_4/R_1$ at minimum operating temperature is about 10, and the change of gap dimension from minimum to maximum temperature is about 0.8 of the gap dimension at minimum operating temperature.

References Cited by the Examiner

UNITED STATES PATENTS

| | | | |
|---|---|---|---|
| 1,871,287 | 8/1932 | Whittaker | 138—46 |
| 1,923,408 | 8/1933 | Zerk | 138—46 |
| 2,043,465 | 6/1936 | Clifford | 188—100 |
| 2,332,994 | 10/1943 | Draper | 73—497 |
| 2,548,608 | 4/1951 | Janos | 236—93 |
| 2,662,550 | 12/1953 | Meyer | 251—11 |
| 2,821,268 | 1/1958 | Carbon | 188—100 |
| 2,960,871 | 11/1960 | Ganther | 73—503 |
| 3,082,676 | 3/1963 | Church | 236—80 |

FOREIGN PATENTS 658,744　10/1951　Great Britain.

RICHARD C. QUEISSER, *Primary Examiner.*

JAMES J. GILL, *Examiner.*